United States Patent [19]
Collins, Jr. et al.

[11] Patent Number: 5,237,163
[45] Date of Patent: Aug. 17, 1993

[54] METHOD FOR SCANNING A PLURALITY OF BAR CODE LABELS

[75] Inventors: Donald A. Collins, Jr., Ithaca, N.Y.; Denis M. Blanford, Duluth, Ga.

[73] Assignee: NCR Corporaton, Dayton, Ohio

[21] Appl. No.: 817,192

[22] Filed: Jan. 6, 1992

[51] Int. Cl.$^5$ .............................................. G06K 7/10
[52] U.S. Cl. ...................................... 235/472; 235/462
[58] Field of Search ................................. 235/462, 472

[56] References Cited
FOREIGN PATENT DOCUMENTS
120330 8/1979 Japan .

*Primary Examiner*—Harold Pitts
*Attorney, Agent, or Firm*—Richard W. Lavin

[57] ABSTRACT

A method for processing the reading of bar code tags or labels in which a bar code scanner reads a plurality of bar code tags in the field of view of the scanner while in a stationary position generating tag representation for each tag read comprising the steps of storing in a first storage unit the first tag representation, comparing each succeeding tag representation with the first tag representation and generating a count representing the number of times the same tag read was read for use in processing the bar code tags in the minimum amount of time.

7 Claims, 3 Drawing Sheets

METHOD FOR SCANNING A PLURALITY OF BAR CODE LABELS

Background of the Invention

The present invention relates to optical bar code scanning systems and more particularly to a method for reading all bar code labels located within the field of view of a hand-held scanner as fast as possible without requiring the operator to move the scanner.

In present-day merchandising point-of-sale operations, representation pertaining to the purchase of a merchandise item is obtained by reading representation encoded indicia such as a bar code label printed on or attached to the merchandise item. In order to standardize the bar codes used in various point-of-sales checkout systems the grocery industry had adopted a uniform product code (UPC) which is in the form of a bar code comprising a series of bars and spaces. In a multiple bar code, such as UPC, each decimal number or numerical character is represented by bars and spaces which are scanned by an optical scanner resulting in the generation of binary representation representing such bars and spaces. In those instances where more than one tag is to be read, the scanner will scan the tags in succession, sending the coded representation to a processing unit in the sequence that they are read. Where the scanner is pointed at a plurality of tags, it is necessary for the processing unit to remember what tag was previously read and not process the same tag again if such reading had occurred concurrently in the scanning operation.

It is therefore a principal object of this invention to provide an improved scanning system for scanning a plurality of bar code labels during a single scanning operation of the optical scanner.

It is a another object of this invention to provide such a processing method which detects the number of times the same tag is scanned within a predetermined time period.

It is a further object of this invention to provide a scanning system which is high in reader efficiency while low in cost.

SUMMARY OF THE INVENTION

In order to fulfill these objects, there is disclosed a method for processing representation representing a plurality of scanned bar code labels or tags including the steps of storing each tag representation in a RAM buffer, enabling a "same tag" counter to generate a count each time the same tag is read and enabling a timer to start the running of a timeout period. As each subsequent tag representation is generated, it is compared with the representation previously stored. If it corresponds to a previously read tag, the tag count is increased by one and the timer is disabled. If it is a new representation, the representation is time stamped and stored in a RAM buffer and the counter and timer associated with that buffer are reset to start a new operation.

BRIEF DESCRIPTION OF THE DRAWINGS

These and other objects, features and advantages of the invention, as well as the invention itself, will become more apparent to those skilled in the art in light of the following detailed description taken into consideration with the accompanying drawings wherein like reference numerals indicate like or corresponding parts throughout the several views in which.

DESCRIPTION OF THE PREFERRED EMBODIMENT

Figure 1:
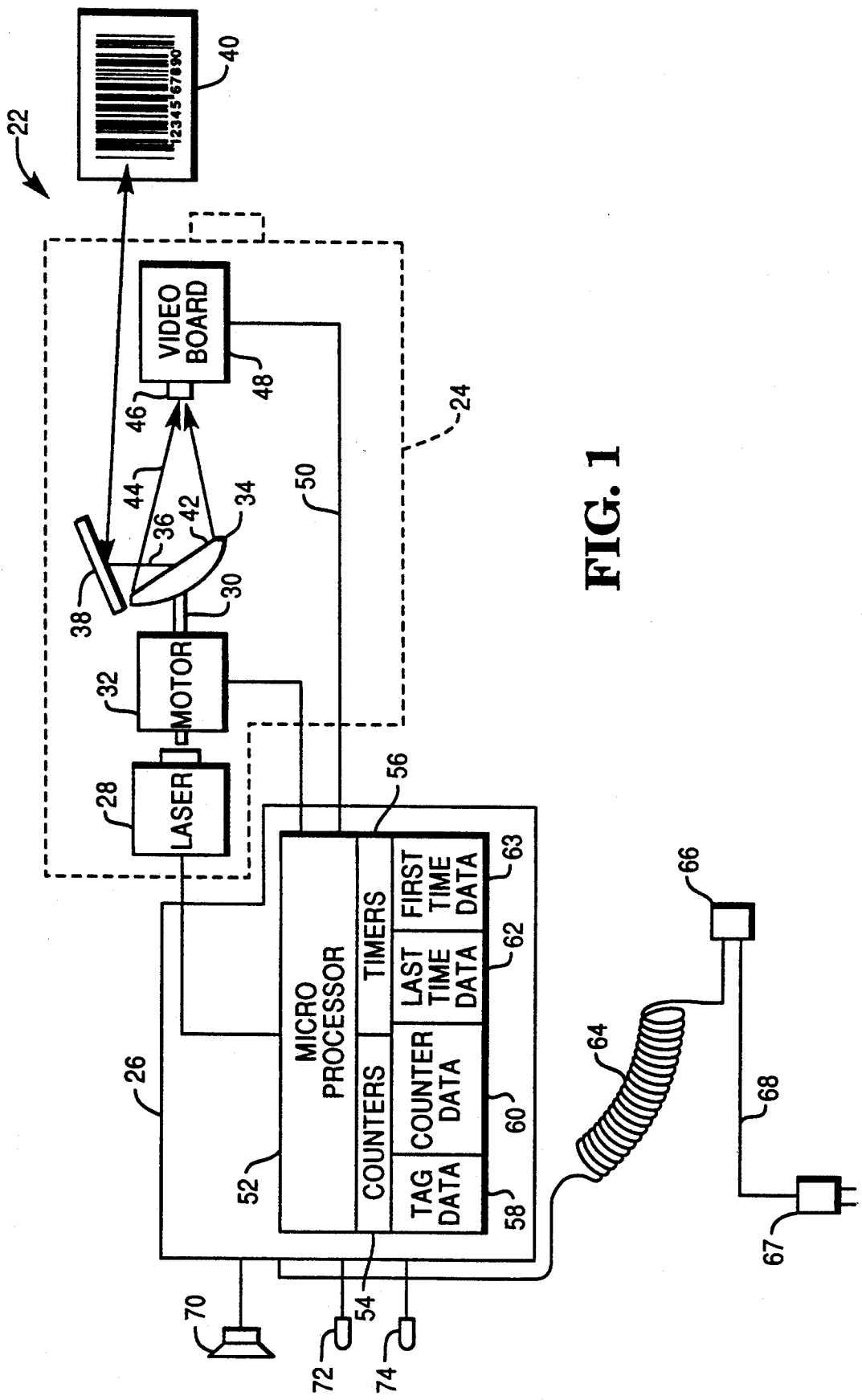
FIG. 1 is a detailed schematic representation of an optical scanner used in implementing the method of the present invention.

Referring to FIG. 1, there is shown a detailed schematic representation of the optical scanner used in implementing the method of the present invention in which the optical scanner is generally represented by the numeral 22 including a scan module 24 and a printed circuit board 26. The scan module 24 includes a laser 28 positioned adjacent one end of the drive shaft 30 which is operated by a motor 32. Mounted on the other opposite end of the drive shaft 30 is an optical transceiver 34 which extends across the drive shaft 30 and includes a deflecting portion (not shown) which deflects the laser light beam 36 outputted by the laser member 28 outwardly towards a ring of mirrors 38 which forms a scanning pattern for scanning a bar code label 40 and a collection portion 42 which collects the reflected light beams 44 from the bar code label or tag 40 and directs the light beams at a photodetector 46. The photodetector 46 is located on a video board 48 and will generate electrical signals in response to receiving the reflected light beams in a manner that is well known in the art. The electrical signals are transmitted over line 50 to a microprocessor 52 mounted on the printed circuit board 26 for decoding the electrical signals. The construction of the scan module 24 is fully disclosed in U.S. Pat. No. 4,971,410, which is assigned to the assignee of the present invention and which is fully incorporated herein by reference.

The microprocessor 52 includes a plurality of counters 54 and timers 56 which are used to time stamp the representation representing each scanned tag 40 read by the scanner. The microprocessor 52 also includes RAM buffer portions 58-63 inclusive for storing tag representations, counter data and time stamped data for use by the microprocessor 52 to decode each different bar code tag read by the scanner, as will be described more fully hereinafter.

The printed circuit board 26 further includes circuitry for transmitting the decoded signals from the microprocessor 52 over coiled cable 64 to a remote processing unit 66. Power is supplied to the laser 28, the motor 32, and the photodetector 46 through electrical plug 67, line 68 and the cable 64. The printed circuit board 26 additionally contains circuitry for operating a speaker 70, and green and red indicator lights 72 and 74, which represent valid and invalid reading operations, respectively.

Figure 2:
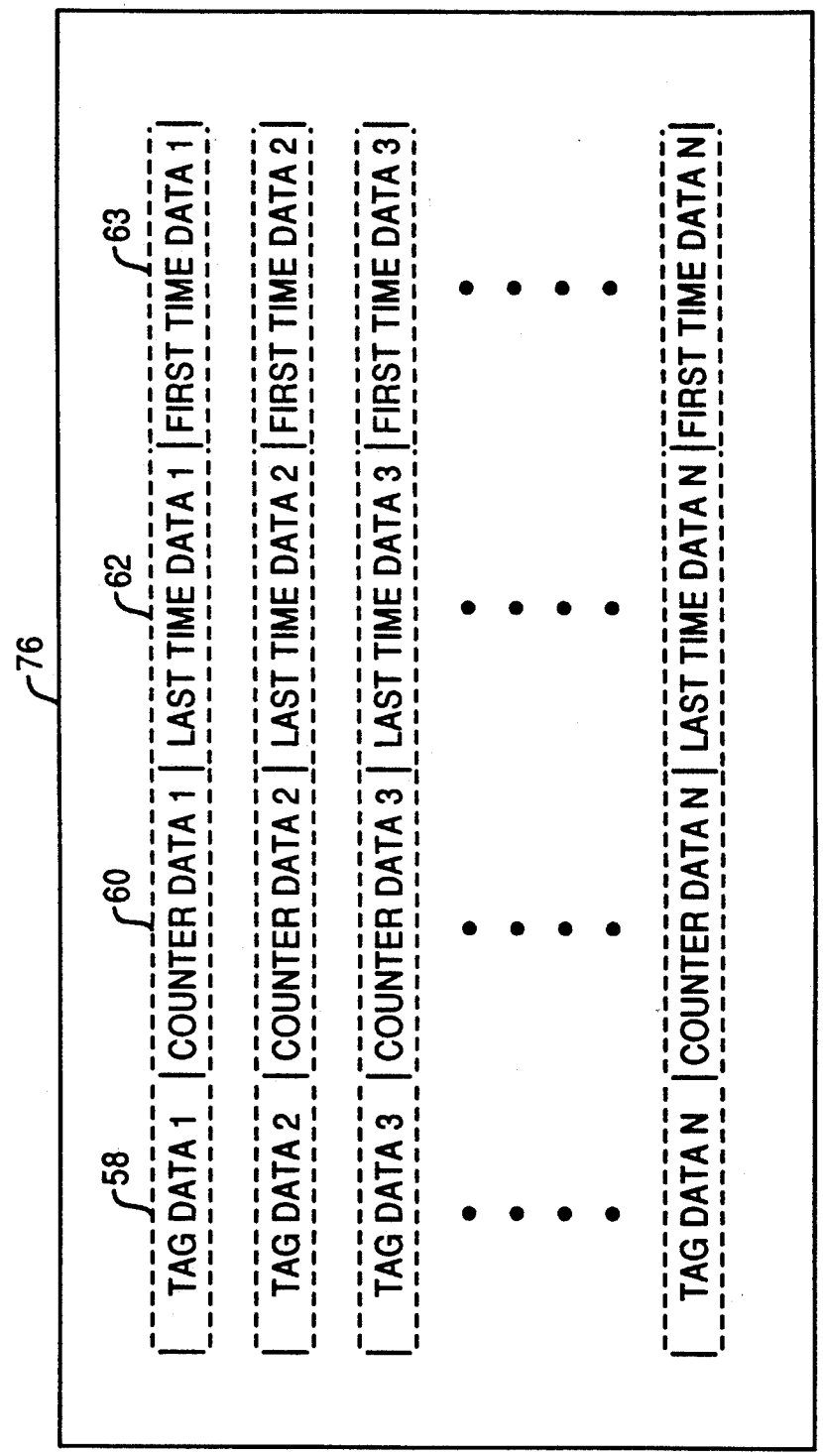
FIG. 2 is a diagrammatic representation of a portion of the memory in the microprocessor showing the storage locations of the tag representation buffers, the counter representation buffers and time stamped representation associated with each tag read.

Referring now to FIG. 2, there is shown a schematic diagram of a RAM memory portion of the microprocessor 52. The RAM memory portion 76 includes N number of storage locations 58-63 inclusive in which is stored data representing each tag that is read and its associated counter and time stamped data representing the time the tag was last read and the time that it was first read in a manner to be described more fully hereinafter. Each time the microprocessor 52 receives a tag representation, the microprocessor will store the representation in one of storage locations 58 and start the operation of one of the counters 54 (FIG. 1) to count the number of times a representation is received representing the same tag. This data is stored in an associated storage location 60. The microprocessor will also enable one of the timers 56 to start the running of a timeout period upon receiving the tag representation for the first time to control the length of the scanning operation. The microprocessor will also time stamp the occurrence of the tag representation when first read and last read for use with the operation of the timeout period associated with the reading of the tags.

Figure 3:
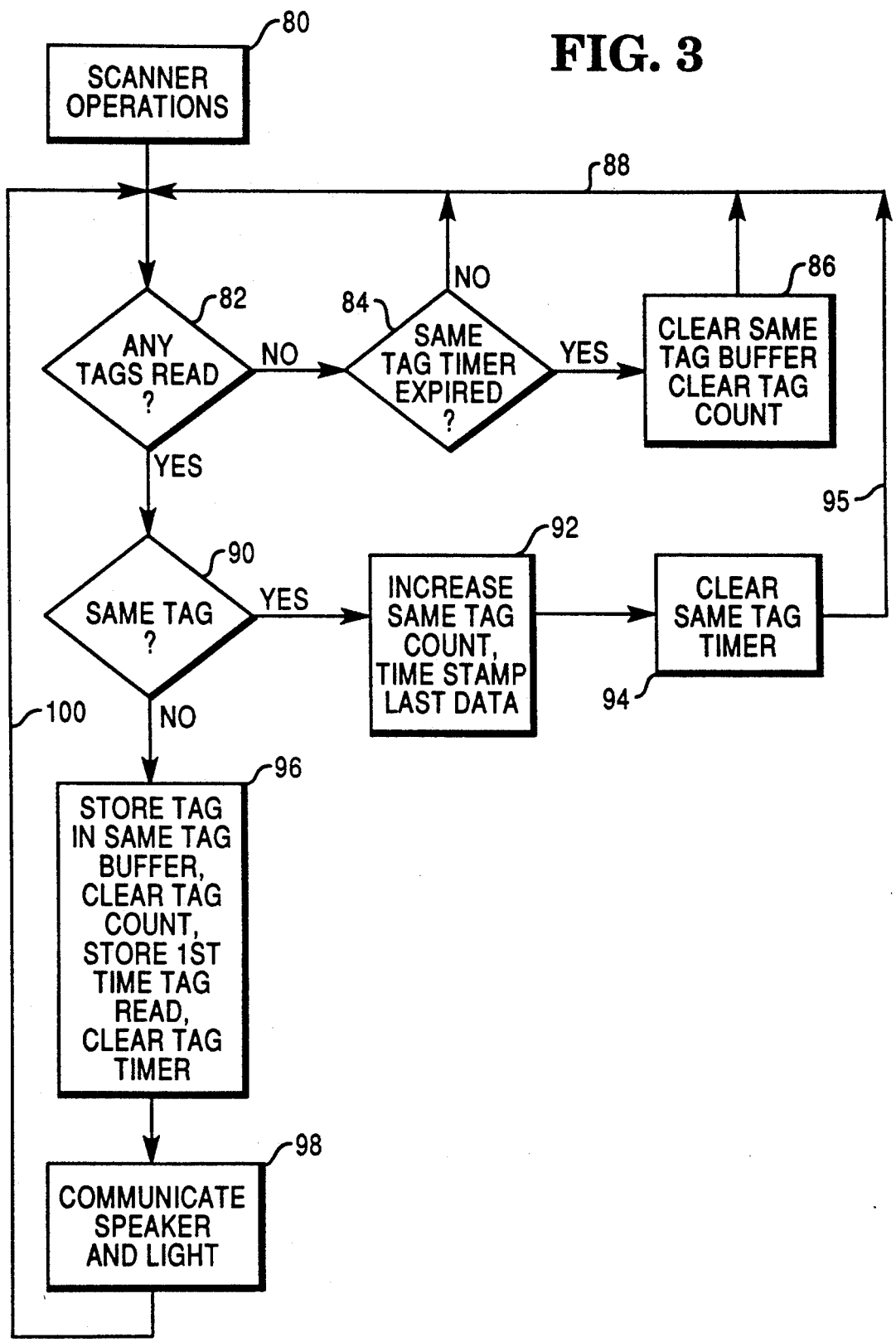
FIG. 3 is a flowchart of the operation of the scanner in accordance with the present invention.

Referring now to FIG. 3, there is shown a flowchart of the operation of the microprocessor 52 in processing the tag representation. Upon the scanner being powered and scanning a bar code tag (block 80), the microprocessor will determine if any tag or bar code labels have been read (block 82). If the microprocessor does not detect the presence of any tag representation on line 50 (FIG. 1), the microprocessor will check to see if one of the counters 54, characterized as a same tag counter and operated to generate a timeout period within which a tag has to be processed, has timed out (block 84). If it has, the microprocessor will clear the storage buffers or locations 58 (FIGS. 1 and 2) containing any same tag representations and storage locations 60 containing any tag counter and time data (block 86) and return over path 88 to block 82 and again check if there is any tag representation on line 50 from the video board 48 (FIG. 1). If the microprocessor 52 finds that a same tag timer 56 has not timed out (block 84), the microprocessor will return over path 88 to block 82 to see if any tags have been read.

After detecting the presence of a tag representation, the microprocessor will check the tag representations already stored in storage locations 58, 62 and 63 (block 90) to determine if the tag has been read previously. If it has, the microprocessor will enable the tag representation's associated same tag counter 54 (FIG. 1) to increase the count that is stored in storage location 60 (FIG. 3) by one, and time stamp the tag representation as the last time data which is stored in the buffer location 62 (FIG. 2)(block 92), clear the tag representation's associated same tag timer 56 (block 94) and return over paths 95 and 88 to block 82 for the next tag reading operation.

If the microprocessor 52 finds that the tag representation has not been previously read (block 90), the microprocessor will store the tag representation in one of the storage locations or buffers 58 characterized as a same tag buffer (FIG. 2), clear the associated same tag counter 54, time stamp the representation as first time data enabling the representation to be stored in storage location 63 (FIG. 2) and clear the same tag timer 56 (block 96). When the data associated with with reading of the tag is to be transmitted to the remote processing unit 66, the microprocessor 52 will transmit the data which is stored in storage locations 58-63 inclusive enabling the processing unit to determine the sequence and frequency of the tags read for use in processing the data in the minimum amount of time. The microprocessor will then transmit the data to the remote processing unit 66 (FIG. 1), and operate the speaker 70 and the indicator light 72 indicating that a valid read operation has occurred (block 98). The microprocessor will then return over path 100 to block 82 to detect if any tag representation is present.

It will be seen from this construction that the processing of the tag data will be shortened since the tag data that is sent to the remote processing unit will consist of only representation that pertains to the different tags scanned by the scanner together with the number of times the same tag was read, allowing the processing unit to process all of the tags in the minimum amount of time.

While the principles of the invention have now been made clear in an illustrated embodiment, it will be obvious to those skilled in the art that many modifications of structure, arrangements and components can be made which are particularly adapted for specific environments and operating requirements without departing from those principles. The appended claims are therefore intended to cover and embrace any such modifications, within the limits only of the true spirit and scope of the invention.

What is claimed is:

1. A method for processing the reading of a plurality of bar-code tags or labels in which a bar-code scanner reads each of a number of bar-code tags located in the field of view of the scanner at the same time while in a stationary position generating a tag representation for each tag read, comprising the steps of:

storing in a first storage unit data representing the first tag representation;

generating a count representing the first tag read;

comparing each succeeding tag representation with the first tag representation;

increasing the count each time a tag representation is found to be the same as the first tag representation; and storing the count generated in a second storage unit indicating the number of readings of the same tag by the scanner for use in processing all of the tag representations.

2. The method of claim 1 which further includes the stop of starting a timeout period to run upon storing the first tag representation in the first storage unit.

3. The method of claim 1 which further includes the stop of storing second tag representation in a second storage unit when the second tag representation is found not to be the same as the first tag representation.

4. The method of claim 3 which further includes the stop of starting a second timeout period to run upon storing the second tag representation in the second storage unit.

5. The method of claim 2 which further includes the step of storing data representing the timeout period generated and clearing the timeout period when a subsequent tag representation is found to be the same as the first tag representation.

6. The method of claim 5 which further includes the step of detecting if a timeout period has expired when no tag representation is generated by the scanner.

7. The method of claim 1 which further includes the step of storing in a third storage unit time data indicating the time the same tag was last read to increase the time of reading the bar code tags.

* * * * *

UNITED STATES PATENT AND TRADEMARK OFFICE
CERTIFICATE OF CORRECTION

PATENT NO.   :   5,237,163
DATED        :   August 17, 1993
INVENTOR(S)  :   Donald A. Collins, Jr. et al.

It is certified that error appears in the above-identified patent and that said Letters Patent is hereby corrected as shown below:

Column 4, line 42, "stop" should be --step--.

Column 4, line 45, "stop" should be --step--.

Column 4, line 49, "stop" should be --step--.

Signed and Sealed this

Eighth Day of March, 1994

*Attest:*

BRUCE LEHMAN

*Attesting Officer*     *Commissioner of Patents and Trademarks*